(No Model.)  2 Sheets—Sheet 1.
G. W. AKINS, J. T. NELSON & W. VERNOR.
WHEEL CULTIVATOR.

No. 304,058. Patented Aug. 26, 1884.

Witnesses:
Inventors:
George W. Akins.
John T. Nelson.
William Vernor
By A. Bell
atty N. PETERS, Photo-Lithographer, Washington, D. C.

(No Model.) 2 Sheets—Sheet 2.

G. W. AKINS, J. T. NELSON & W. VERNOR.
WHEEL CULTIVATOR.

No. 304,058. Patented Aug. 26, 1884.

Witnesses:
Inventors:
George W. Akins
John T. Nelson
William Vernor

UNITED STATES PATENT OFFICE.

GEORGE W. AKINS, JOHN T. NELSON, AND WILLIAM VERNOR, OF NASHVILLE, ILLINOIS.

WHEEL-CULTIVATOR.

SPECIFICATION forming part of Letters Patent No. 304,053, dated August 26, 1884.

Application filed May 2, 1884. (No model.)

*To all whom it may concern:*

Be it known that we, GEORGE W. AKINS, JOHN T. NELSON, and WILLIAM VERNOR, citizens of the United States, residing at Nashville, county of Washington, and State of Illinois, have invented a new and useful Improvement in Cultivators, of which the following is a specification.

The object of our invention is to secure a simple and effective cultivator capable of properly preparing the ground on either side of the corn-row without injury to the growing corn.

Our invention relates to improvements in the axle-bar, the adjustment of the plow-beam thereon, and the operating mechanism for lifting and lowering the plows.

Figure 1:
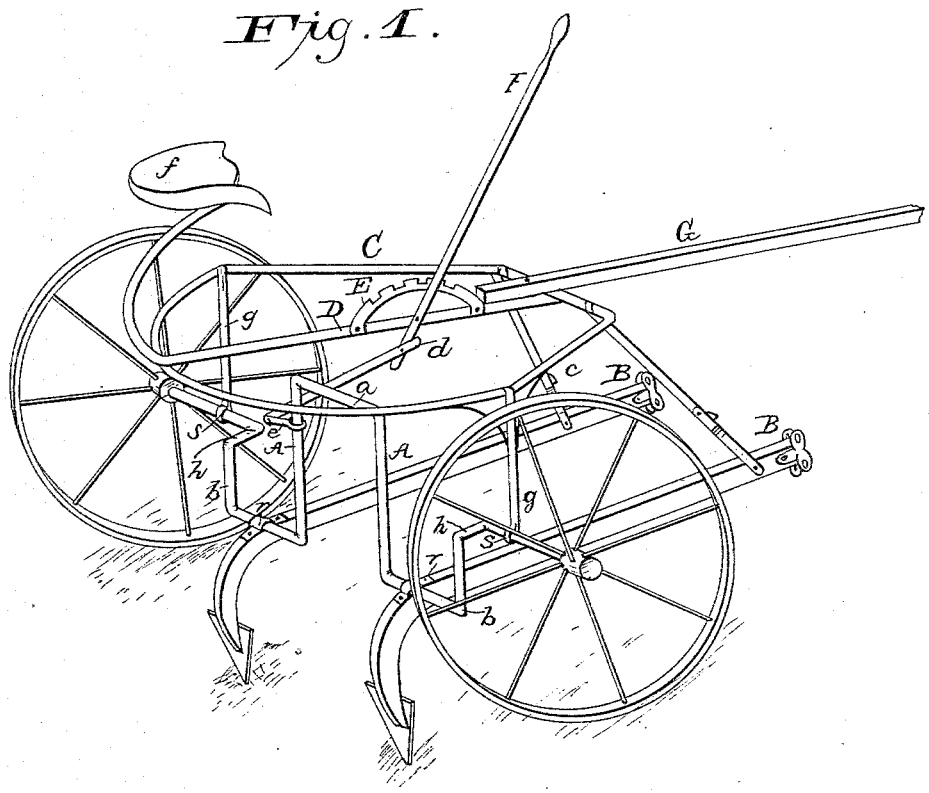
Figure 2:
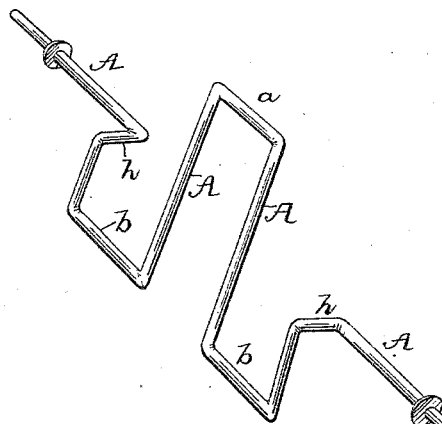
Figure 3:
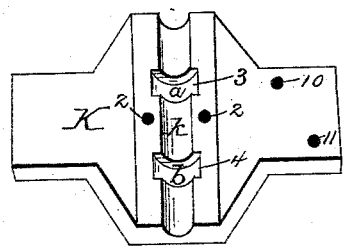
Figures 4, 5, 6:
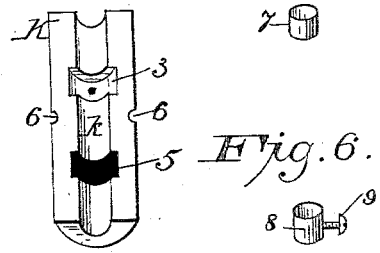
Figure 7:
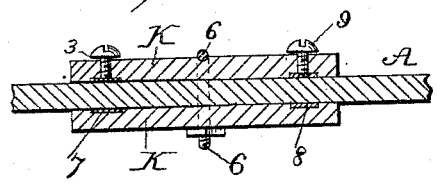
Figure 8:
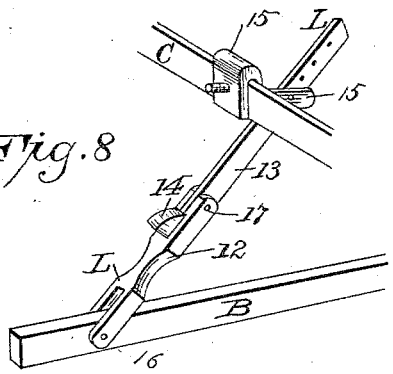
Figure 9:
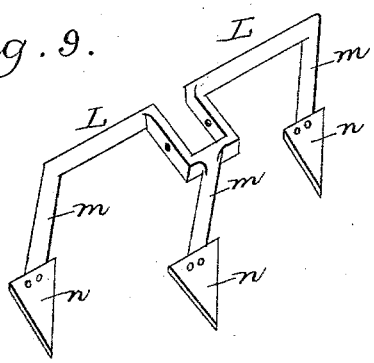

Figure 1 represents a perspective view of the improved cultivator. Fig. 2 represents a plan view of the axle of the cultivator. Fig. 3 represents the lower section of the crank-axle box acting as the plow-beam hanger, showing plan of journal-grooves therein. Fig. 4 represents the upper section or cap of the crank-axle box shown in Fig. 3. Fig. 5 represents the ring-band fitting around crank-axle bar and into recesses in the grooves of said axle-box shown in Figs. 3 and 4. Fig. 6 represents the ring-band provided with set-screw fitting around crank-axle bar and into the recesses of the grooves shown in Figs. 3 and 4. Fig. 7 represents a longitudinal section of the crank-axle box shown in Figs. 3 and 4, and said axle-bar moving therein. Fig. 8 represents the adjustable bridle connecting the drag-beam to the frame. Fig. 9 represents the shovel attachment, which may be attached to the plow-beam in place of the plowshare shown in Fig. 1.

Like letters and figures represent like parts.

In Fig. 1, A is the axle-bar, on which the wheels are journaled, said axle-bar having a clearing-arch, $a$, and double cranks $b\ b$ on each side thereof. B B are the plow-beams for right and left hand plows, secured to the double cranks $b\ b$ by means of journal-hangers K at $r\ r$. $h\ h$ are rectangular offsets of the axle-bar A. C is the frame resting on standard $g$, having axle-bearings at S S. D is the seat-bar on which hand-lever F is fulcrumed and the segmental rack-bar E is secured. G is the pole secured to seat-bar and frame. $d$ is the link-lever connecting the hand-lever F to the lever-arm $e$, rigidly attached to the axle-bar.

In Fig. 2, $h\ h$ represent the rectangular offsets which carry the clearing-arch and double cranks away from the line of wheel-spindles, so as to give greater elevation to the double cranks and clearing-arch by the rotation of the axle.

In Fig. 3, K represents the axle-box in which the double cranks are journaled, the lower plate of the said box acting as the plow-beam hanger, the beam being secured to the under face by staple-bolts through openings 10 and 11. $k$ is the lower section of the journal-groove, having recesses 3 and 4 therein, into which the bands 7 and 8 (shown in Figs. 5 and 6) are loosely held. These bands prevent the lateral movement of the plow-beam on the axle by means of the set-screw 9, which passes through band 8 and impinges on the axle-bar. The cap shown in Fig. 4 is secured in its place by means of a staple-bolt countersunk in the upper face of the cap, and bolted to the lower plate through openings 2 2. (Shown in Fig. 3.) The slot 5 (shown in Fig. 4) is to provide room for the movement of the set-screw 9, holding band 8 securely upon the axle when the axle rotates within the boxing by reason of the lifting or lowering of the plow-beam. The journal-hanger K slightly tapers, growing smaller toward the slotted end, the enlargement being vertically and intended to regulate the level of the plow when working in ground having a sloping surface. This feature is shown in Fig. 7, where the regulating-screw, passing through the cap at 3, is shown as applied.

In Fig. 8, L represents the adjustable bridle which connects the plow-beam B to the frame C. This bridle is constructed in two pieces hinged together at 17. The lower arm of the bridle is loosely pivoted to the plow-beam at 16. Its upper arm is loosely pivoted to a supporting-bracket, 15, rigidly secured to the frame C. The joint 17 of the bridle, acting as a hinge, allows a free movement upward of the arms at the point of junction; but a downward movement out of a straight line is prevented by the projecting foot 14, said foot, when the two arms are in a line, being in contact with the upper end of the lower arm.

The function of this jointed bridle is to prevent the vertical movement of the plow-beam while plowing, and to adjust itself by means of the joint 17 to the movement of the beam when the plow is lifted from the ground.

We claim as our invention—

1. In a wheel-cultivator, an axle-bar having two crank-bearings to carry the plow-beams, a clearing-arch between said cranks, and a rectangular offset on the spindle sides of the bearing-cranks, carrying said cranks and the clearing-arch away from the line of the spindles, in combination with an operating-lever and a frame, whereby additional elevation is secured to the clearing-arch and double cranks by the rotation of the axle when the plows are raised from the ground, substantially as set forth.

2. In a wheel-cultivator, an axle-bar having two double cranks, a clearing-arch between said cranks, and a rectangular offset carrying said cranks and clearing-arch away from the line of the wheel-spindles, in combination with hand-lever F, link-lever d, rigidly-attached lever-arm e, rack-bar E, seat-bar D, and frame C, substantially as set forth.

3. In a wheel-cultivator, in combination with a crank-axle, frame, and plow-beam, journal-box K, having an adjustable cap secured to the lower section thereof by staple-bolt 6, countersunk in said cap, the journal-opening in said box vertically enlarged toward one end, recesses 3 and 4 in said journal, ring-bands 7 and 8, fitting therein, slot 5, and set-screws, whereby the lateral movements of the plow-beam on the axle-bar are prevented and the plow adjusted for sloping ground, substantially as set forth, 4. In a wheel-cultivator, in combination with a crank-axle, plow-beam, and frame, jointed bridle L, having brace-arms 12 and 13, jointed together at 17, and projecting foot 14, arranged and combined as shown and described, substantially as and for the purposes set forth.

GEORGE W. AKINS.
JOHN T. NELSON.
WILLIAM VERNOR.

Witnesses:
FRANK FRANZLAN,
J. P. RICKMAN.